(12) United States Patent
Lee et al.

(10) Patent No.: US 11,156,785 B1
(45) Date of Patent: Oct. 26, 2021

(54) OPTICAL FIBER CONNECTOR DEVICE

(71) Applicants: Gloriole Electroptic Technology Corp., Kaohsiung (TW); Amphenol Fiber Optic Technology (Shenzhen) Co., Ltd., Shenzhen (CN)

(72) Inventors: Yen-Chang Lee, Kaohsiung (TW); Li-Yun Chen, Kaohsiung (TW)

(73) Assignees: GLORIOLE ELECTROPTIC TECHNOLOGY CORP., Kaohsiung (TW); AMPHENOL FIBER OPTIC TECHNOLOGY (SHENZHEN) CO., LTD., Shenzhen (CN)

( * ) Notice: Subject to any disclaimer, the term of this patent is extended or adjusted under 35 U.S.C. 154(b) by 0 days.

(21) Appl. No.: 16/995,335

(22) Filed: Aug. 17, 2020

(51) Int. Cl.
*G02B 6/36* (2006.01)
*G02B 6/38* (2006.01)

(52) U.S. Cl.
CPC .......... *G02B 6/387* (2013.01); *G02B 6/3825* (2013.01); *G02B 6/3879* (2013.01); *G02B 6/3897* (2013.01)

(58) Field of Classification Search
CPC .... G02B 6/387; G02B 6/3897; G02B 6/3879; G02B 6/3825; G02B 6/36
See application file for complete search history.

(56) References Cited

U.S. PATENT DOCUMENTS

| | | | | |
|---|---|---|---|---|
| 9,203,167 B2* | 12/2015 | Holliday | ............... | H01R 24/38 |
| 9,946,036 B2* | 4/2018 | Carapella | ............. | G02B 6/3897 |
| 2015/0003784 A1* | 1/2015 | Islam | ................... | G02B 6/3879 |
| | | | | 385/62 |
| 2019/0310428 A1* | 10/2019 | Takeuchi | ............. | G02B 6/3825 |

FOREIGN PATENT DOCUMENTS

TW        M445188 U     1/2013

* cited by examiner

*Primary Examiner* — Jennifer Doan
(74) *Attorney, Agent, or Firm* — Muncy, Geissler, Olds & Lowe, P.C.

(57) ABSTRACT

An optical fiber connector device includes an optical fiber connector that includes an LC connector head and an optical fiber cable connected together along an axis, and an insert unit that includes a housing entirely molded as one piece. The housing has an outer wall which defines a main opening, and a surrounding wall which defines an insert opening. The main opening and the insert opening are open respectively towards opposite directions along the axis. The connecting subunit includes a first connecting member inserted into the main opening, and connected to the LC connector head, and a second connecting member coupled to the first connecting member, and adapted to be connected to another optical fiber connector.

4 Claims, 4 Drawing Sheets

OPTICAL FIBER CONNECTOR DEVICE

FIELD

The disclosure relates to a connector device, and more particularly to an optical fiber connector device.

BACKGROUND

Referring to FIG. 1, Taiwanese Utility Model Patent No. M445188 discloses a conventional optical fiber connector device 1 which includes a housing 11, a seat unit 12 removably connected with the housing 11, a connecting unit 13 disposed in the seat unit 12, a fixing unit 14 threadedly connected to the housing 11, and a dust-proof cover 15.

Since a surrounding wall 121 and a cover 122 of the seat unit 12 are designed to be individual components and engageable with each other, the process of assembling the connecting unit 13 with the seat unit is simplified, without the need for welding. Therefore, deformation and other effects caused by heat from welding can be avoided.

However, in the conventional optical fiber connector device 1, not only does the seat unit 12 need to be assembled with the connecting unit 13, the seat unit 12 and the housing 11 also need to undergo assembly. This not only makes the assembly process more time and effort-consuming, but also causes dimensional tolerance to accumulate due to the large number of individual components, which negatively affects the transmission efficiency of the optical fibers and the water-resistant property of the optical fiber connector device 1.

SUMMARY

Therefore, the object of the disclosure is to provide an optical fiber connector device that can alleviate at least one of the drawbacks of the prior art.

According to the disclosure, an optical fiber connector device includes an optical fiber connector and an insert unit.

The optical fiber connector includes an LC connector head, an optical fiber cable and a guide member. The optical fiber cable is connected to the LC connector head along an axis. The guide member is connected to the optical fiber cable, and abuts the LC connector head along the axis for facilitating connection between the LC connector head and the optical fiber cable.

The insert unit includes a housing and a connecting subunit.

The housing has an outer wall and a surrounding wall. The outer wall surrounds the axis, and defines a main opening on the axis. The surrounding wall surrounds the axis, defines an insert opening on the axis, and is connected to the outer wall. The main opening and the insert opening are open respectively towards opposite directions along the axis. The housing is entirely molded as one piece.

The connecting subunit includes a first connecting member and a second connecting member. The first connecting member is inserted into the main opening, and defines two insert slots. The LC connector head is inserted into the insert slots of the first connecting member. The second connecting member is surrounded by the surrounding wall, is coupled to the first connecting member, and is adapted to be connected to another optical fiber connector.

BRIEF DESCRIPTION OF THE DRAWINGS

Other features and advantages of the disclosure will become apparent in the following detailed description of the embodiment with reference to the accompanying drawings, of which.

DETAILED DESCRIPTION

Figure 1:
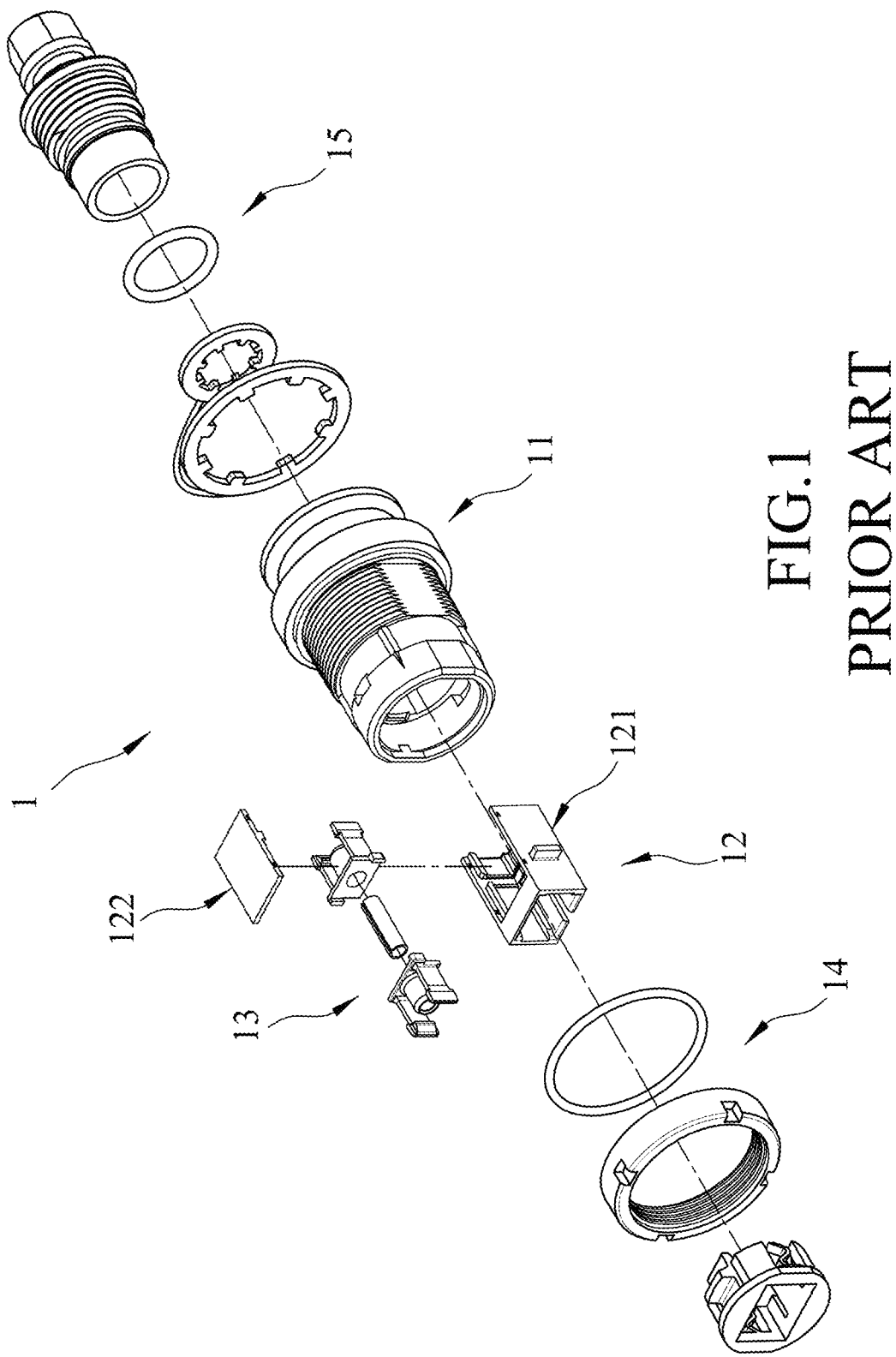
FIG. 1 is an exploded perspective view of a conventional optical fiber connector device disclosed in Taiwanese Utility Model Patent No. M445188.
Figure 2:
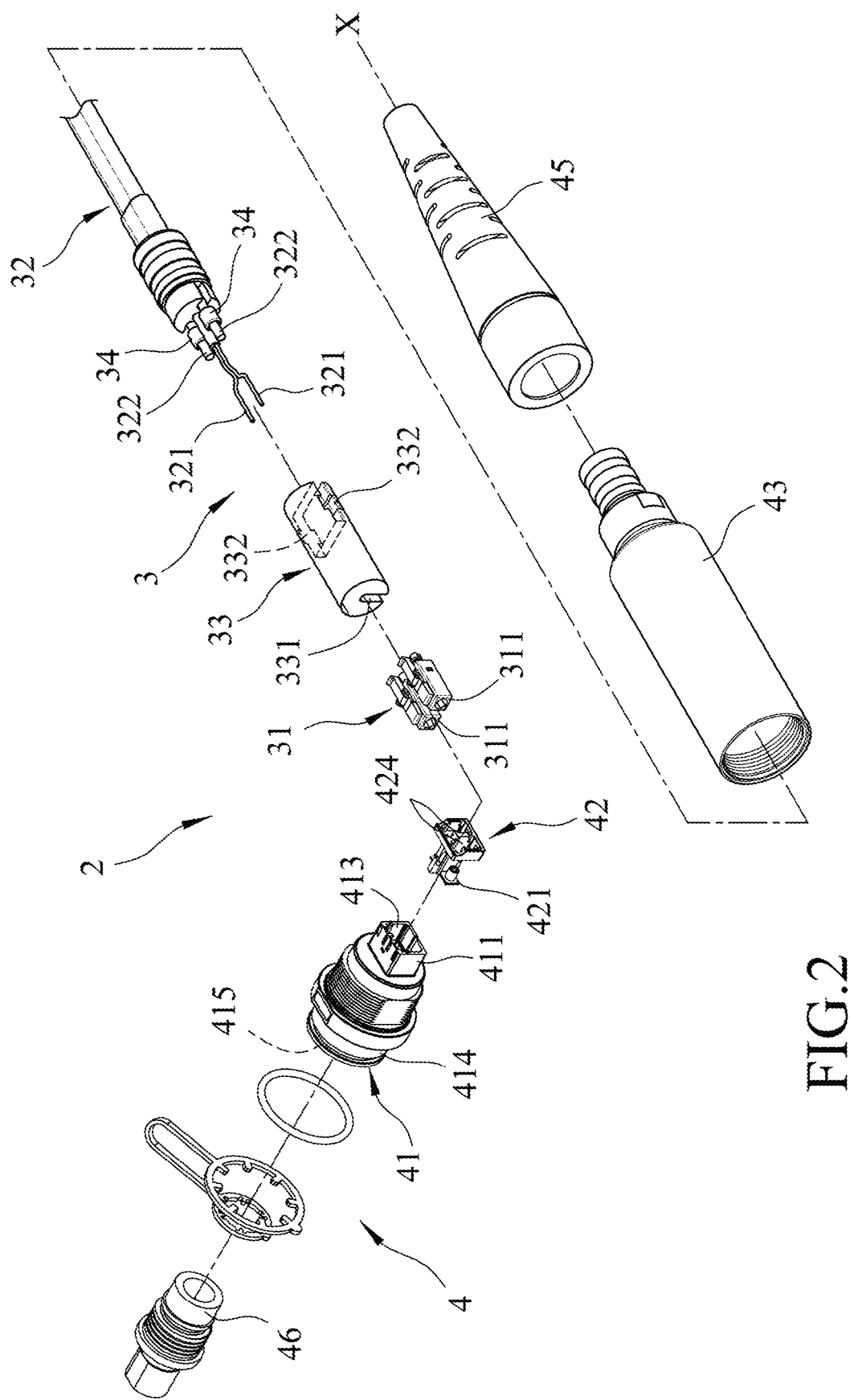
FIG. 2 is a fragmentary exploded perspective view of an embodiment of an optical fiber connector device according the disclosure.
Figure 3:
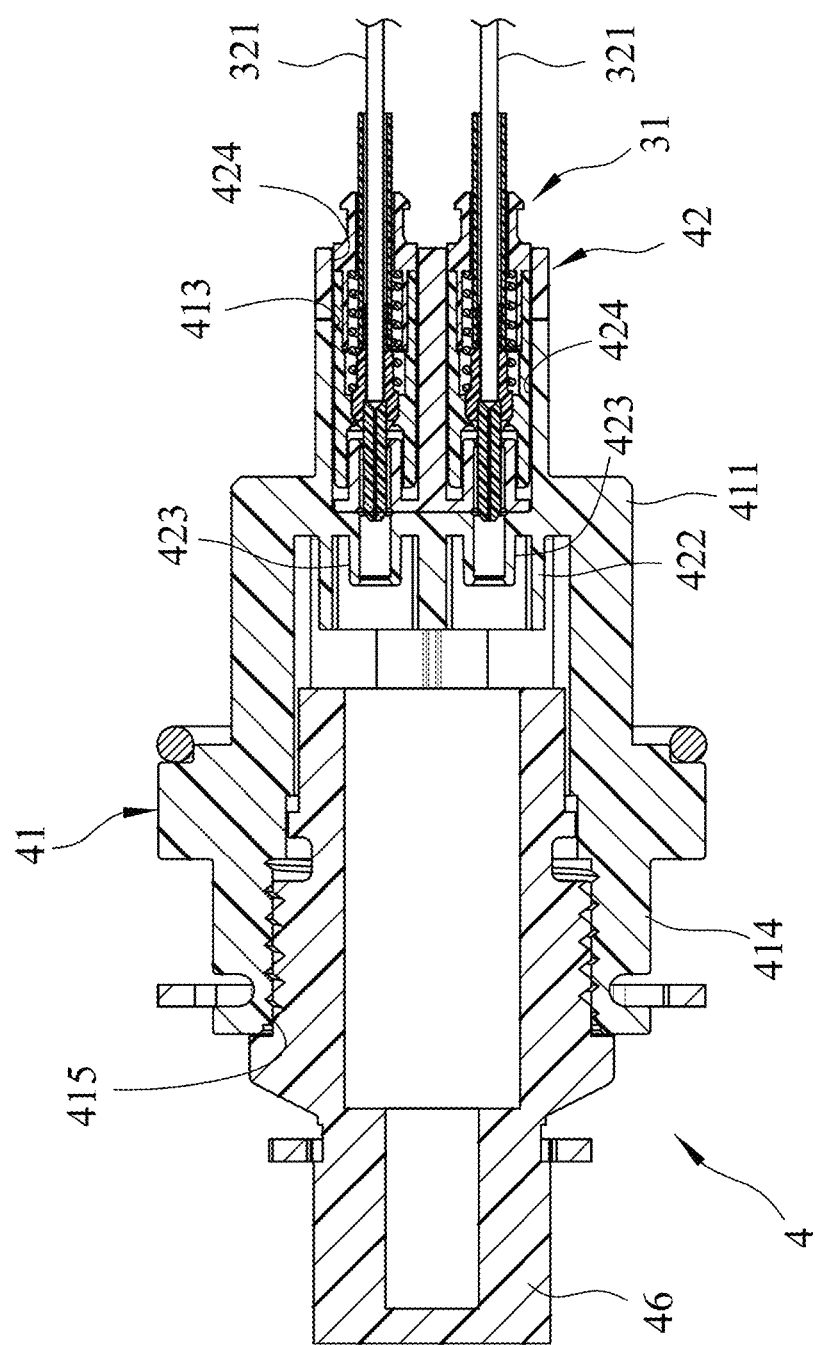
FIG. 3 is a partially assembled fragmentary sectional top view of the embodiment.
Figure 4:
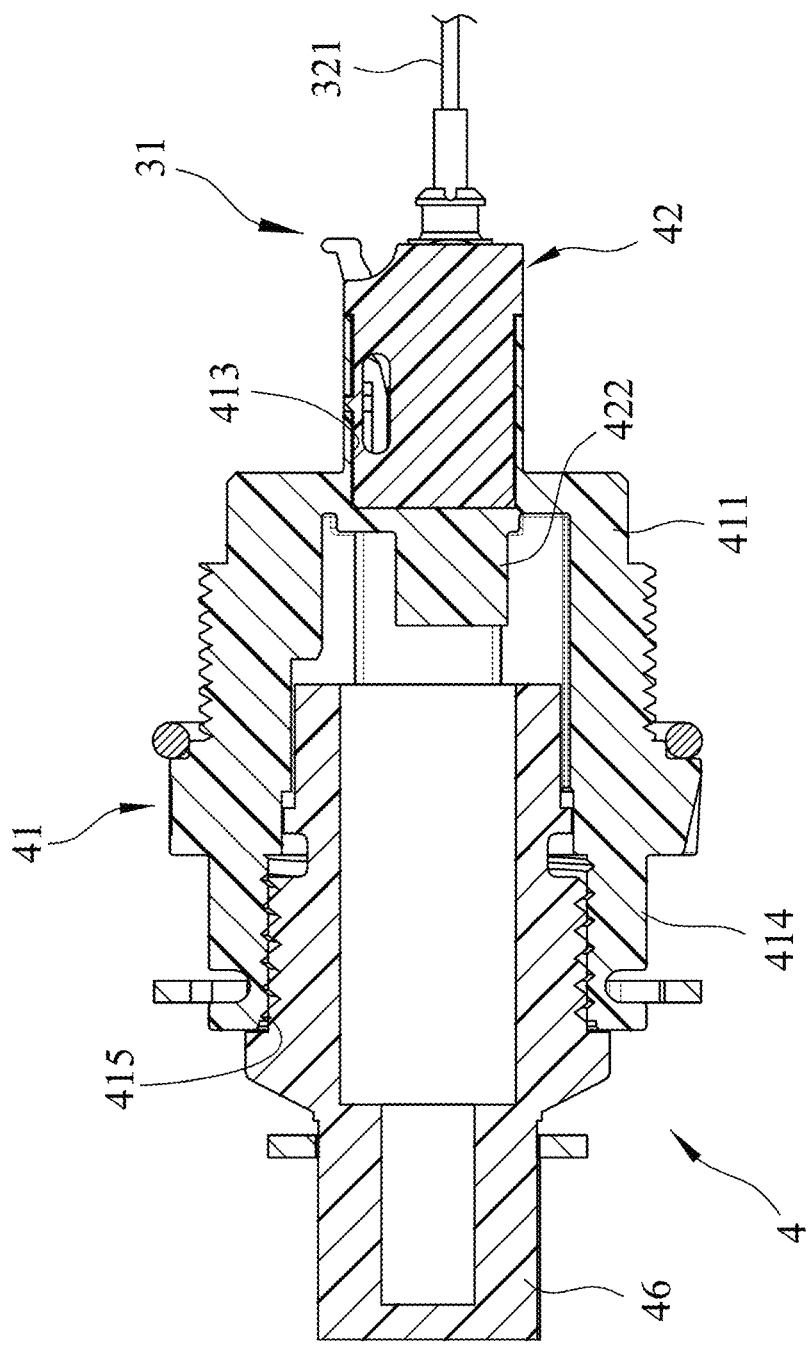
FIG. 4 is another partially assembled fragmentary sectional side view of the embodiment.

Referring to FIGS. 2, 3 and 4, an embodiment of an optical fiber connector device 2 according to the disclosure includes an optical fiber connector 3 and an insert unit 4.

The optical fiber connector 3 is a Lucent Connector (LC), and includes an LC connector head 31, an optical fiber cable 32, a guide member 33, and two reinforcing rings 34.

The optical fiber cable 32 is connected to the LC connector head 31 along an axis (X). The guide member 33 is connected to the optical fiber cable 32, and abuts the LC connector head 31 along the axis (X) for facilitating the connection between the LC connector head 31 and the optical fiber cable 32. Each of the reinforcing rings 34 is connected between the optical fiber cable 32 and the guide member 33 for securing the connection therebetween.

Specifically, the LC connector head 31 has two connecting segments 311, each of which is formed with a through hole extending in a direction parallel to the axis (X). The guide member 33 is formed with a guide groove 331, and two engaging grooves 332 disposed at opposite sides of the guide groove 331. The optical fiber cable 32 includes two fiber optic strands 321 and two reinforcing parts 322. Each of the fiber optic strands 321 of the optical fiber cable 32 extends through the guide groove 331 of the guide member 33, and into the through hole of a respective one of the connecting segments 311 of the LC connector head 31. Each of the reinforcing rings 34 is fixedly sleeved on a respective one of the reinforcing parts 322 of the optical fiber cable 32, and is tightly engaged with a respective one of the engaging grooves 332 of the guide member 33 such that the optical fiber cable 32 is prevented from becoming detached from the guide member 33 when under an external pulling force.

The insert unit 4 includes a housing 41, a connecting subunit 42, a tail tube 43, a tail cover 45 and a dust-proof cover 46.

The housing 41 is entirely molded as one piece, and has an outer wall 411 and a surrounding wall 414 that are connected together, and that each surrounds the axis (X). The outer wall 411 defines a main opening 413 on the axis (X), and the surrounding wall 414 defines an insert opening 415 on the axis (X). The main opening 413 and the insert opening 415 are open respectively towards opposite directions along the axis (X).

The connecting subunit 42 includes a first connecting member 421, a second connecting member 422 and two linking tubes 423.

The first connecting member 421 is inserted into the main opening 413 of the outer wall 411 of the housing 41, and defines two insert slots 424. Each of the connecting segments 311 of the LC connector head 31 of the optical fiber connector 3 is inserted into a respective one of the insert slots 424 of the first connecting member 421.

The second connecting member 422 is surrounded by the surrounding wall 414 of the housing 41, is coupled to the first connecting member 421, and is adapted to be connected to another optical fiber connector (not shown).

The linking tubes 423 are surrounded by the surrounding wall 414 of the housing 41, are connected to the second connecting member 422, and are respectively in spatial communication with the insert slots 424 of the first connecting member 421.

The tail tube 43 is threadedly connected to the housing 41. The guide member 33 is disposed in the tail tube 43 and is secured between the LC connector head 31 and the tail tube 43. The guide groove 331 of the guide member 33 extends along the tail tube 43.

The tail cover 45 is connected to an end of the tail tube 43 opposite to the housing 41, and is sleeved on the optical fiber cable 32 such that the optical fiber cable 32 protrudes therefrom.

The dust-proof cover 46 is detachably connected to an end of the housing 41 distal from the tail cover 45, and covers the insert opening 415 of the housing 41 to keep off dust and dirt when the optical fiber connector device 2 is not in use.

During use, a user simply removes the dust-proof cover 46 from the housing 41 to uncover the insert opening 415, and insert the another optical fiber connector (not shown) into the insert opening 415 to be connected to the second connecting member 422 of the connecting subunit 42, so that the another optical fiber connector and the optical fiber connector 3 of the present embodiment are in signal communication with each other via the connecting subunit 42.

In summary, by virtue of the housing 41 of the insert unit 4 being entirely molded as one piece, the present embodiment of the disclosure has advantages over the prior art of having fewer individual components, and hence less assembly time and less tolerance accumulation, which consequently improve the transmission efficiency of the fiber optic strands 321 as well as the water-resistant property of the optical fiber connector device 2.

In the description above, for the purposes of explanation, numerous specific details have been set forth in order to provide a thorough understanding of the embodiment. It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects, and that one or more features or specific details from one embodiment may be practiced together with one or more features or specific details from another embodiment, where appropriate, in the practice of the disclosure.

While the disclosure has been described in connection with what is considered the exemplary embodiment, it is understood that this disclosure is not limited to the disclosed embodiment but is intended to cover various arrangements included within the spirit and scope of the broadest interpretation so as to encompass all such modifications and equivalent arrangements.

What is claimed is:

1. An optical fiber connector device comprising:
    an optical fiber connector including
        an LC connector head,
        an optical fiber cable that is connected to said LC connector head along an axis, and
        a guide member that is connected to said optical fiber cable, and that abuts said LC connector head along the axis for facilitating connection between said LC connector head and said optical fiber cable; and
    an insert unit including
        a housing that has
            an outer wall surrounding the axis, and defining a main opening on the axis, and
            a surrounding wall surrounding the axis, defining an insert opening on the axis, and being connected to said outer wall, said main opening and said insert opening being open respectively towards opposite directions along the axis, said housing being entirely molded as one piece, and
        a connecting subunit that includes
            a first connecting member being inserted into said main opening, and defining two insert slots, said LC connector head being inserted into said insert slots of said first connecting member, and
            a second connecting member surrounded by said surrounding wall, coupled to said first connecting member, and adapted to be connected to another optical fiber connector.

2. The optical fiber connector device as claimed in claim 1, wherein said insert unit further includes:
    a tail tube that is threadedly connected to said housing, said guide member being disposed in said tail tube and being secured between said LC connector head and said tail tube; and
    a tail cover that is connected to an end of said tail tube opposite to said housing, and that is sleeved on said optical fiber cable such that said optical fiber cable protrudes therefrom.

3. The optical fiber connector device as claimed in claim 2, wherein said guide member has a guide groove that extends along said tail tube, and that is provided for said optical fiber cable to extend therethrough.

4. The optical fiber connector device as claimed in claim 3, wherein said connecting subunit further includes two linking tubes that are connected to said second connecting member, and that are respectively in spatial communication with said insert slots of said first connecting member.

\* \* \* \* \*